US007380826B2

(12) United States Patent
Schönauer

(10) Patent No.: US 7,380,826 B2
(45) Date of Patent: Jun. 3, 2008

(54) INDUSTRIAL TRUCK HAVING AN ADD-ON UNIT

(75) Inventor: Michael Schönauer, Moosburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 425 days.

(21) Appl. No.: 11/108,556

(22) Filed: Apr. 18, 2005

(65) Prior Publication Data

US 2005/0236799 A1 Oct. 27, 2005

(30) Foreign Application Priority Data

Apr. 23, 2004 (DE) ...................... 20 2004 006 462

(51) Int. Cl.
*B60R 9/06* (2006.01)

(52) U.S. Cl. ...................... 280/769; 280/762; 411/270; 411/371.2; 414/685

(58) Field of Classification Search ................ 280/762, 280/769, 186; 411/270, 371.2, 531; 403/408.1, 403/388; 414/685
See application file for complete search history.

(56) References Cited

U.S. PATENT DOCUMENTS

| | | | | |
|---|---|---|---|---|
| 3,424,328 | A | 1/1969 | Gideonsen | |
| 3,819,078 | A * | 6/1974 | Walsh | 414/671 |
| 4,165,008 | A | 8/1979 | Faust | |
| 4,594,026 | A * | 6/1986 | Hauer et al. | 405/153 |
| 4,699,388 | A * | 10/1987 | Sproccati et al. | 279/48 |
| 5,141,357 | A * | 8/1992 | Sherman et al. | 403/408.1 |
| 5,533,863 | A * | 7/1996 | Tornquist et al. | 415/229 |
| 6,240,995 | B1 * | 6/2001 | Corghi | 157/1.22 |
| 6,260,197 | B1 * | 7/2001 | Hoogewind | 2/8.3 |
| 7,108,036 | B2 * | 9/2006 | Spaggiári | 157/1.24 |

FOREIGN PATENT DOCUMENTS

| | | |
|---|---|---|
| DE | 195 28 489 A1 | 2/1997 |
| DE | 195 36 331 A1 | 4/1997 |
| DE | 197 45 110 C2 | 7/2003 |
| DE | 202 01 927 U1 | 7/2003 |

OTHER PUBLICATIONS

German Search Report dated Feb. 1, 2005.
European Search Report dated Oct. 11, 2006.

* cited by examiner

*Primary Examiner*—Christopher P. Ellis
*Assistant Examiner*—John D Walters
(74) *Attorney, Agent, or Firm*—Scott D. Wofsy; Edwards Angell Palmer & Dodge LLP

(57) ABSTRACT

The invention relates to an industrial truck having a mounting plate and an add-on unit, which is fixed to said mounting plate by means of at least one fixing means, a bearing surface, which points towards the mounting plate, of the add-on unit being in touching contact with a mounting surface, which points towards the add-on unit, of the mounting plate, and at least one of the surfaces (bearing surface and mounting surface) being formed such that it is curved convexly at least in the section of the touching contact.

16 Claims, 2 Drawing Sheets

INDUSTRIAL TRUCK HAVING AN ADD-ON UNIT

Figure 1:
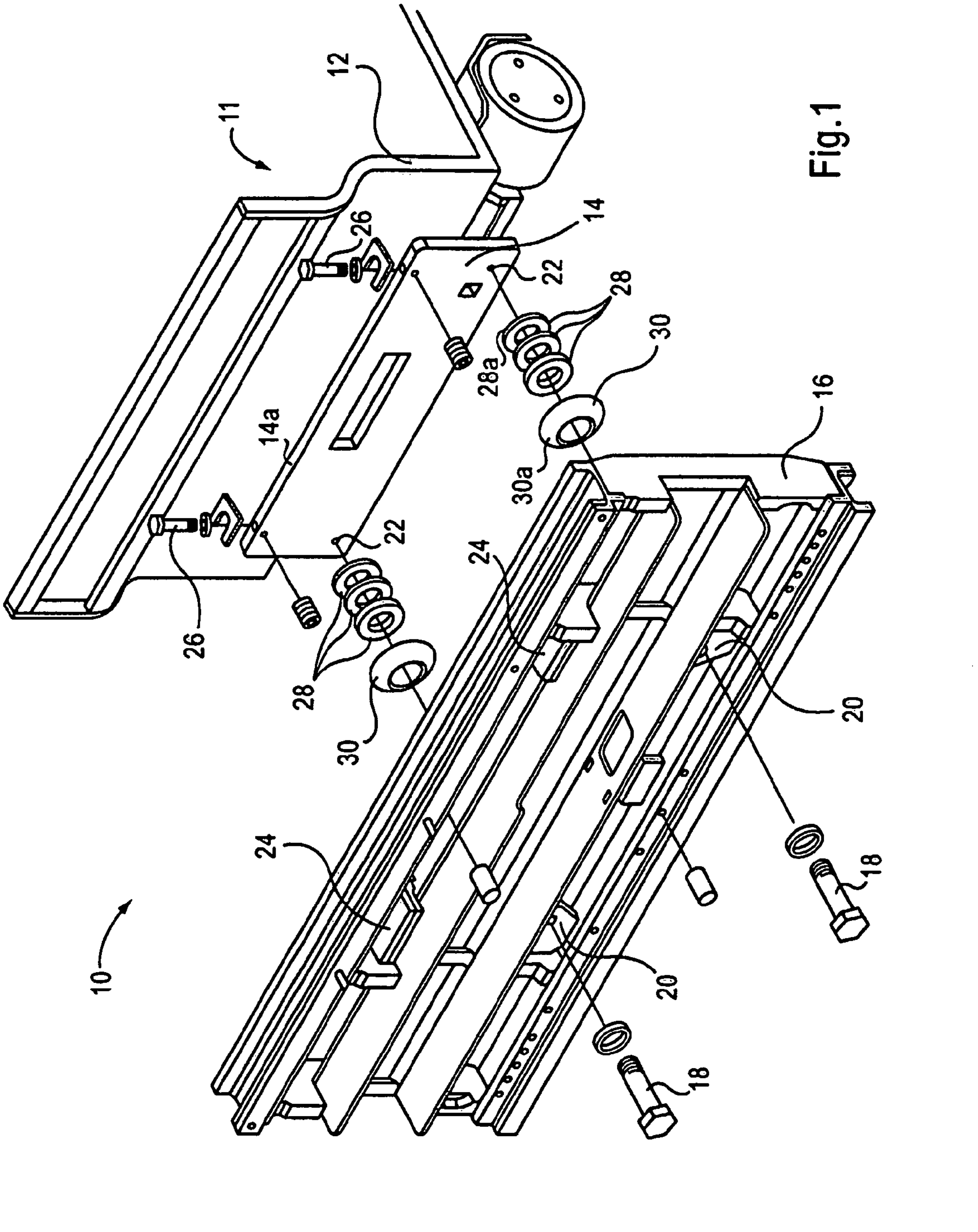

The present application relates to an industrial truck having a mounting plate and an add-on unit, which is fixed to said mounting plate by means of at least one fixing means, a bearing surface, which points towards the mounting plate, of the add-on unit being in touching contact with a mounting surface, which points towards the add-on unit, of the mounting plate.

In an alternative modification of this industrial truck, at least one intermediate element may be provided between the mounting plate and the add-on unit, in this case a bearing surface, which points towards the mounting plate, of the add-on unit being in touching contact with a first contact surface, which points towards the add-on unit, of an intermediate element, and a mounting surface, which points towards the add-on unit, of the mounting plate being in touching contact with a second contact surface, which points towards the mounting plate, of an intermediate element.

Such industrial trucks are generally known. The apparatuses which are generally known as add-on units may be, for example, a side-loader, a telescopic table, a clamp fork or the like. The mounting plate is in this case a universally designed mounting plate which is formed for the purpose of accommodating different add-on units. The mounting plate is a type of standardized coupling point for the purpose of coupling industrial truck base bodies to add-on units.

Since the add-on unit of an industrial truck needs to be designed both for absorbing a high force and for precise positioning, the attachment of the add-on unit to the mounting plate is of particular importance. The attachment needs to be sufficiently stable and rigid such that it allows for precise positioning of the add-on unit and/or its submodules in relation to the industrial truck base body even at high loads borne by the industrial truck. Add-on units are therefore often screwed onto the mounting plate whilst applying high tightening torques. In order to prevent relative movements between the mounting plate and the attachment device, a bearing disc, which is fixedly connected to the add-on unit, is often pressed flat against the mounting plate with the action of the fixing means.

In many cases, the mounting plate, which is connected to the industrial truck, and/or the bearing disc, which is connected to the add-on unit, are not ideally precise in terms of shape and/or position, with the result that, when the add-on unit is fixed to the mounting plate, deformations and resultant bracing may result on the add-on unit and on the mounting plate. These bracing forces, which may occur on the add-on unit and on the mounting plate, may subject the structures, which are connected to the respective component (mounting plate and bearing disc), i.e. the industrial truck base body and the add-on unit, to a load.

The relatively high bracing may further result, during operation of the industrial trucks, in an undesirable formation of noise, which is expressed, for example as "rattling". Even the noise per se is disruptive, but it is possible to deduce, erroneously, that there is a fault on or damage to the industrial truck on the basis of the noise produced and for the industrial truck to be subjected to an inspection during which time it is not available for operation.

It is therefore the object of the present invention to specify a technical teaching, with which an add-on unit can be fitted to a mounting surface of an industrial truck base body whilst avoiding bracing forces owing to the fixing. Furthermore, the development of noise on the abovementioned industrial trucks should be minimized.

Said object is achieved in accordance with a first viewpoint in the case of an industrial truck of the type mentioned initially by at least one of the surfaces (bearing surface and mounting surface) being formed such that it is curved convexly at least in the section of the touching contact.

The abovementioned object is also achieved in accordance with a second viewpoint in the case of an industrial truck having at least one intermediate element, which is arranged between the mounting plate and the add-on unit, by at least one of the surfaces (bearing surface, first and second contact surface and mounting surface) being formed such that it is curved convexly at least in the section of the touching contact.

The solution according to the invention makes it possible for there to be a compensation movement of the components (add-on unit and mounting plate) in relation to one another, with the result that, even when a high or even a very high fixing force is applied, deformation of the components (add-on unit and mounting plate) occurs to a lesser extent than in the prior art, which results in reduced bracing forces. As a result, the total load on the structures connected to the abovementioned components is reduced and their life is increased. With reduced bracing, there are also fewer noises at the mounting point.

The convex formation of at least one of the surfaces in the section of the touching contact makes possible at least a slight sliding or rolling movement of the abovementioned components in relation to one another.

As a result, the add-on unit can be aligned during assembly.

Reference will be made to the fact that the first and the second contact surfaces can be provided on one and the same intermediate element or else on different intermediate elements. Express reference should also be made to the fact that the mounting plate may be of integral or multi-part design. Different parts of the mounting plate may be arranged on different sections of the industrial truck.

It is possible, in principle, for the convexly curved section of the at least one surface to be in a form of a partial cylinder, i.e. to be curved about an axis. The convexly curved section, however, is preferably formed such that it is curved about two axes which are orthogonal with respect to one another, with the result that a sliding, tipping or rolling movement about two axes, which are orthogonal with respect to one another, is possible between the add-on unit and the mounting surface. For this purpose, the convexly curved section may be, for example, in the form of a barrel or an ellipsoid. The mentioned examples for formations of the convexly curved section have, for each axis of curvature, another radius of curvature, with the result that there may be a preferred direction for compensation movements.

It is therefore preferable for the convexly curved section of the at least one surface to be in the form of a spherical dome. If a surface, which is in the form of a spherical dome, bears against another surface, under always essentially the same circumstances any desired tipping movement of the spherical dome may take place about a tipping axis which lies on a plane which is clamped by the abovementioned axes which are orthogonal with respect to one another.

The section of an opposing surface, with which the convexly curved section of the abovementioned surface is in touching contact, may be of planar design in a simple case. In this case, although a compensatory rolling movement of the components (add-on unit and mounting plate) in relation to one another is possible with suitable formation of the convexly curved section in all spatial directions, owing to small touching contact surfaces between a convex surface section and a planar surface section there may be a very high surface pressure at the point of touching contact between the convexly curved surface section and a planar opposing surface section. This may lead to high material loads. It is likewise possible, in principle, for the section of the opposing surface to likewise be curved convexly, which may possibly make it easier for compensation movements to be carried out in specific directions which are subjected to a particularly high load, which may, however, likewise lead to a high surface pressure.

In order to prevent such a high surface pressure, provision may be made for the section of an opposing surface, with which the convexly curved section of the at least one surface is in touching contact, to be formed such that it is curved concavely. In this case, a surface pressure which is as low as possible is obtained in the section of the touching contact when the concavely curved section of the opposing surface is matched to the convexly curved section of the at least one surface such that the convexly curved section is in flat touching contact with the concavely curved section. In this case, a type of "ball joint" is formed on the convexly curved section using the above mentioned spherical dome, in the case of which the concavely curved section of the opposing surface represents a partially spherical ball socket which conforms to the spherical dome. The convexly curved surface section and the concavely curved opposing surface section may in this case slide in relation to one another, which results in the components on which the surface section and the opposing surface section are formed being tipped in relation to one another.

A load on the at least one surface having a convex curvature, which load is particularly favourable because it is symmetrical, may be obtained by the convexly curved section of the at least one surface having the fixing means passed through it. In addition or as an alternative, the concavely curved section of the at least one opposing surface may have the fixing means passed through it in order to provide a symmetrical introduction of force around the fixing point.

The mounting plate, just as the attachment device, frequently represents blocking components having relatively large dimensions. For this reason, it may be less advantageous from a manufacturing point of view to provide the convexly curved section on these components. With lower machining complexity, it is possible for the convexly curved section to be provided in a more advantageous manner on an intermediate element.

In this case it is further advantageous if the intermediate element having the convexly curved section is arranged in the industrial truck such that the convexly curved section is provided on the first contact surface of the intermediate element which is in touching contact with the bearing surface. In this case, the mounting plate, which should be designed to accommodate a large number of different add-on units, can be produced with very little machining complexity. On the other hand, a concave recess can be provided in a simple manner on the add-on unit, with which an intended use is always associated, for example by milling, and the convexly curved section of the intermediate element comes to bear in said recess.

Mention should also be made of the fact that the intermediate elements may be spacer discs or adjusting discs, which are introduced between the add-on unit and the mounting plate for the purpose of finely adjusting a desired position of the add-on unit in relation to the mounting plate.

Figure 2:
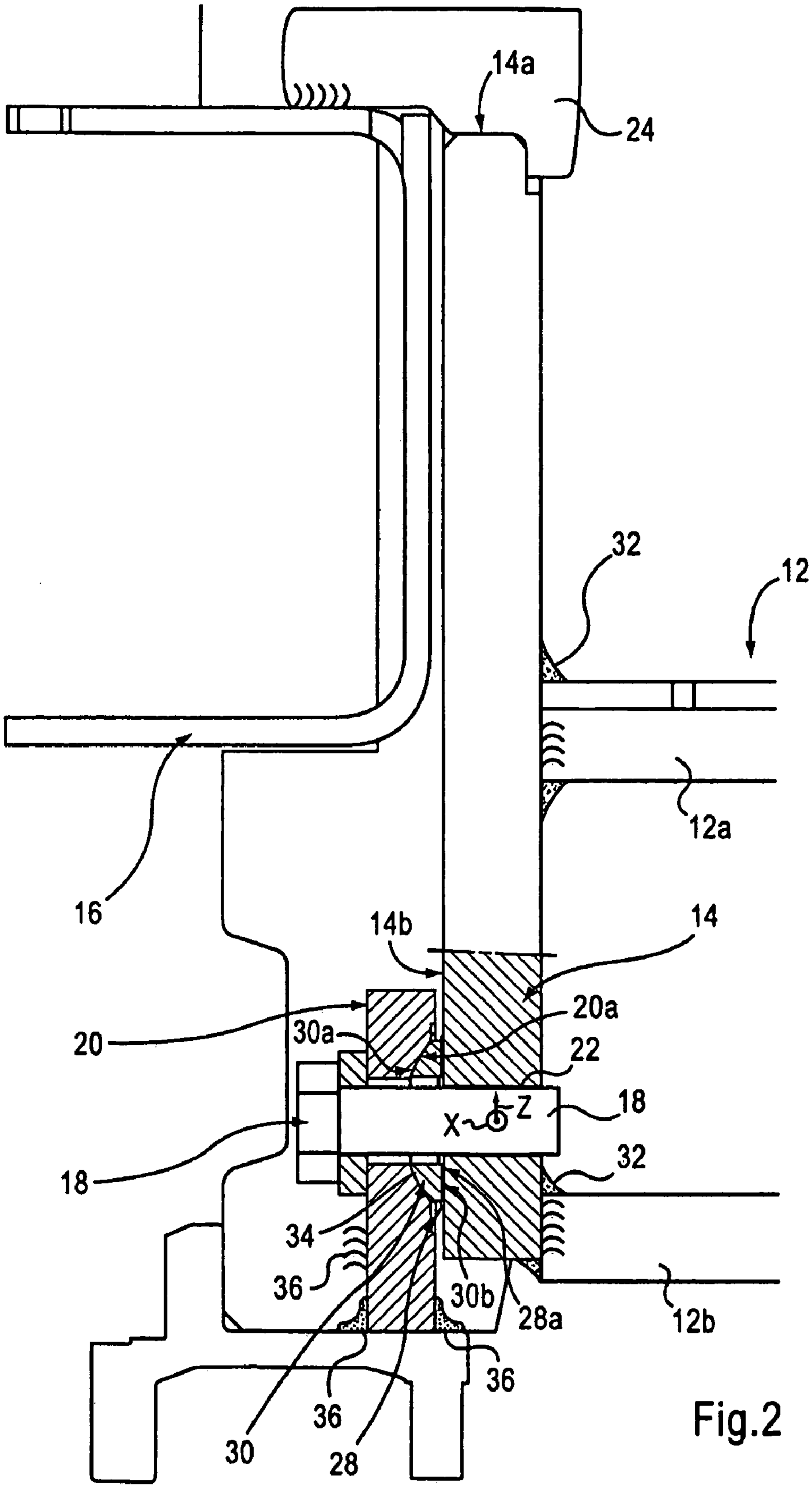

The present invention will be explained below with reference to two figures, in which:

FIG. 1 shows a perspective exploded view of an industrial truck base body having a mounting plate fitted thereon and a side-loader as an add-on unit, and FIG. 2 shows a schematic cross-sectional drawing through a side-loader, as an add-on unit, which is fitted on a mounting plate.

In FIG. 1, an industrial truck according to the invention is generally given the reference numeral 10. Of the industrial truck base body 11 are illustrated a driver's seat support 12 having a mounting plate 14 welded to it. A side-loader 16 is fixed to the mounting plate 14 by means of screws 18.

For this purpose, the screws 18 pass through bearing discs 20, which are fixedly welded to the side-loader 16 as the add-on unit. The screws 18 are screwed into threaded holes 22 in the mounting plate 14.

In addition, the side-loader 16 is suspended using hook elements 24, which are likewise welded to said side-loader 16, at the upper edge 14*a* of the mounting plate 14 and, in addition, is optionally secured to the mounting plate 14 by means of screws 26 in the exemplary embodiment shown.

In the example shown in FIG. 1, four intermediate elements per screw 18 are arranged between the mounting plate 14 and the side-loader 16. The intermediate elements comprise three spacer rings or adjusting rings 28 and a spherical dome disc 30. Both the spacer rings 28 and the spherical dome disc 30 have the screws 18, associated with them, passed through them such that a fixing force exerted by the screws 18 on the bearing discs 20 is absorbed by the intermediate elements 28 and 30 over the entire circumference of said intermediate elements 28 and 30.

FIG. 2 shows a schematic cross section through the mounting plate 14 and the side-loader 16.

The mounting plate 14 is welded onto two supports 12*a* and 12*b* of the driver's seat support 12 by means of weld seams 32.

The partially sectioned side-loader 16 is suspended on the upper edge 14*a* of the mounting plate 14 by means of the hook elements 24.

The mounting surface 14*b*, which points towards the side-loader 16, of the mounting plate 14 is designed to be essentially planar, in order to be able to mount a large number of different add-on units on the mounting plate, such that one and the same driver's seat support 12 can be used for different functions depending on the add-on unit.

A bearing surface 20*a* of the bearing disc 20 is formed with a concave recess 34, into which the spherical dome disc 30 with the first contact surface 30*a*, which is in the form of a spherical dome, protrudes. To be more precise, the recess 34 is partially spherical, with the result that the first contact surface 30*a*, in the form of a spherical dome, of the spherical dome disc 30 bears flat against the bearing surface 20*a* of the bearing disc 20. The spherical dome disc 30 and the bearing disc 20 thus form a ball joint, in the case of which the bearing disc 20 can be pivoted about two axes X and Z, which are orthogonal with respect to one another and lie on the plane of the mounting plate 14, in a sliding movement along the spherical dome disc surface 30*a*. The compensation movement which is thus made possible is a movement involving only very short paths, but contributes to a significant extent to the reduction in noise at the fixing point and to the reduction in bracing forces.

The surface 30*b*, which is opposite the surface 30*a* in the form of a spherical dome, of the spherical dome disc 30 is in touching contact with that spacer ring of the spacer rings 28 which is closest to the side-loader 16. The spacer rings 28 are all in the form of circular cylinders, i.e. having end faces which are parallel to one another and inner or outer surfaces which are in a form of circular cylinders. The end face 28*a*, which is closest to the mounting surface 14*b* (see also FIG. 1), of the spacer ring 28 which is closest to the mounting surface 14*b* forms a second contact surface of an intermediate element in the sense of the present application.

FIG. 2 also indicates how the bearing discs 20 are connected to the main body of the side-loader 16 by means of weld seams 36.

Reference is made to the fact that, in an alternative embodiment, a projection in the form of a spherical dome can be provided integrally on the mounting plate 14, and can bear against the bearing discs 20 without intermediate elements being arranged in between, directly in a corresponding recess. On the other hand, it is likewise possible for a projection in the form of a spherical dome to be provided on the bearing discs 20 and to be able either to bear on a planar mounting surface 14*b* of the mounting plate 14 or to penetrate a partially spherical recess in the mounting plate 14 or, however, with a less advantageous, high surface pressure, to bear against a projection, which is likewise in the form of a spherical dome, of the mounting plate. Further combinations of convexly curved surface sections at the fixing point of the bearing disc 20 to the mounting plate 14 are conceivable.

The invention claimed is:

1. Industrial truck having a mounting plate and an add-on unit which is fixed to said mounting plate by means of at least one fixing means, a bearing surface, which points towards the mounting plate of the add-on unit being in touching contact with a mounting surface, which points towards the add-on unit of the mounting plate, wherein at least one of the bearing surface and the mounting surface is formed such that it is curved convexly at least in the section of the touching contact.

2. Industrial truck having a mounting plate and an add-on unit which is fixed to said mounting plate by means of at least one fixing means with at least one intermediate element being arranged in between, a bearing surface, which points towards the mounting plate of the add-on unit being in touching contact with a first contact surface which points towards the add-on unit of an intermediate element and a mounting surface, which points towards the add-on unit of the mounting plate being in touching contact with a second contact surface, which points towards the mounting plate of an intermediate element, wherein at least one bearing surface, the first contact surface, the second contact surface and the mounting surface is formed such that it is curved convexly at least in the section of the touching contact.

3. Industrial truck according to claim 1, wherein the convexly curved section of the at least one surface is curved about two axes (X, Z) which are orthogonal with respect to one another.

4. Industrial truck according to claim 3, wherein the convexly curved section of the at least one surface is in the form of a spherical dome.

5. Industrial truck according to claim 1, wherein the section of an opposing surface, with which the convexly curved section of the at least one surface is in touching contact, is formed such that it is curved concavely.

6. Industrial truck according to claim 5, wherein the concavely curved section of the opposing surface is matched to the convexly curved section of the at least one surface such that the convexly curved section is in flat touching contact with the concavely curved section.

7. Industrial truck according to claim 1, wherein the convexly curved section of the at least one surface has a fixing means passed therethrough.

8. Industrial truck according to claim 5, wherein the concavely curved section of the at least one opposing surface has a fixing means passed therethrough.

9. Industrial truck according to claim 2, wherein the convexly curved section is provided on an intermediate element.

10. Industrial truck according to claim 9, wherein the convexly curved section is provided on the first contact surface of an intermediate element which is in touching contact with the bearing surface.

11. Industrial truck according to claim 2, wherein the convexly curved section of the at least one surface is curved about two axes (X, Z) which are orthogonal with respect to one another.

12. Industrial truck according to claim 11, wherein the convexly curved section of the at least one surface is in the form of a spherical dome.

13. Industrial truck according to claim 2, wherein the section of an opposing surface, with which the convexly curved section of the at least one surface is in touching contact, is formed such that it is curved concavely.

14. Industrial truck according to claim 13, wherein the concavely curved section of the opposing surface is matched to the convexly curved section of the at least one surface such that the convexly curved section is in flat touching contact with the concavely curved section.

15. Industrial truck according to claim 2, wherein the convexly curved section of the at least one surface has a fixing means passed therethrough.

16. Industrial truck according to claim 13, wherein the concavely curved section of the at least one opposing surface has a fixing means passed therethrough.

* * * * *